(12) United States Patent
Jang et al.

(10) Patent No.: US 7,110,271 B2
(45) Date of Patent: Sep. 19, 2006

(54) INRUSH CURRENT PREVENTION CIRCUIT FOR DC-DC CONVERTER

(75) Inventors: Sang-Hyun Jang, Gyeonggi-do (KR); Kyu-Chan Lee, Seoul (KR); Jong-Dae Kim, Seoul (KR); Jae-Hun Jeong, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 23 days.

(21) Appl. No.: 11/001,802

(22) Filed: Dec. 1, 2004

(65) Prior Publication Data

US 2005/0116693 A1    Jun. 2, 2005

(30) Foreign Application Priority Data

Dec. 2, 2003  (KR) .................. 10-2003-0086739

(51) Int. Cl.
*H02H 7/10* (2006.01)
*G05F 1/40* (2006.01)
*G05F 1/44* (2006.01)

(52) U.S. Cl. .................. 363/50; 323/284; 323/908
(58) Field of Classification Search .................. 363/49, 363/50; 323/274, 284, 901, 908
See application file for complete search history.

(56) References Cited

U.S. PATENT DOCUMENTS

| | | | | |
|---|---|---|---|---|
| 4,236,213 A | * | 11/1980 | Richardson | .................. 701/102 |
| 5,045,989 A | * | 9/1991 | Higaki et al. | .................. 363/37 |
| 5,343,122 A | * | 8/1994 | Sugimori et al. | ........ 315/209 R |
| 5,923,143 A | * | 7/1999 | Cosan et al. | ................ 318/729 |
| 6,204,648 B1 | * | 3/2001 | Saeki et al. | ................ 323/282 |
| 6,700,214 B1 | * | 3/2004 | Ulinski et al. | ............ 290/40 C |
| 6,979,914 B1 | * | 12/2005 | McKelvey et al. | ........ 290/40 C |

* cited by examiner

*Primary Examiner*—Bao Q. Vu
(74) *Attorney, Agent, or Firm*—Peter F. Corless; Edwards Angell Palmer & Dodge LLP

(57) ABSTRACT

An inrush current prevention circuit for a DC-DC converter is provided and in preferred aspects comprises a switching element that transforms an input voltage by being switched on and off and outputs the transformed voltage. A filter filtrates the outputted voltage, transformed via the switching element, and outputs the filtrated voltage as an output voltage. A reference voltage generator generates a reference voltage. An error amplifier compares the reference voltage and output voltage and outputs an error signal. A Pulse Width Modulation (PWM) signal generator generates a PWM signal to switch on and off the switching element according to the error signal. An on-off circuit either transmits or isolates the PWM signal to the switching element. An Electronic Control Unit (ECU) controls the on-off circuit. Preferred systems of the invention can prevent an inrush current immediately following power input or during reactivation of the DC-DC converter.

3 Claims, 3 Drawing Sheets

INRUSH CURRENT PREVENTION CIRCUIT FOR DC-DC CONVERTER

CROSS-REFERENCE TO RELATED APPLICATIONS

The present application is based on, and claims priority from, Korean Application Serial Number 10-2003-0086739, filed on Dec. 02, 2003, the disclosure of which is hereby incorporated by reference herein in its entirety.

FIELD OF THE INVENTION

The present invention relates to a circuit that can prevent an inrush current of a DC-DC converter whereby converter elements are prevented from being damaged by precluding an inrush current in a DC-DC converter during power input or reactivation.

BACKGROUND OF THE INVENTION

Generally, a nonisolated switching DC-DC converter is powered from a voltage source connected to an input terminal and maintains output voltages to be constant regardless of loading conditions. The nonisolated switching DC-DC converter can be classified into a voltage boosting (step-up) or voltage step-down type according to the polarity and size of the output voltage in relation to the input voltage.

The conventional DC-DC converter using one voltage source typically applies a smooth start function in which its Pulse Width Modulation (PWM) switching duty gradually varies during the initial operation, thereby avoiding the generation of an inrush current.

However, there is a drawback in DC-DC converters using two voltage sources for the input and output thereof in that when a stop mode is converted into a drive mode or during power input (i.e., the switching operation is not instantaneously executed due to duty ratios determined according to the battery voltage during reactivation), the two voltages are shorted to each other, causing an indefinite current flow and damage to elements.

The information disclosed in this Background of the Invention section is only for enhancement of understanding of the background of the invention and should not be taken as an acknowledgement of any form of suggestion that this information forms the prior art that is already known to a person skilled in the art.

SUMMARY OF THE INVENTION

In a preferred aspects, systems are provided to optimally restrain the smooth start function and use duty ratios (determined according to the battery voltage) to promptly activate the switching operation during power input or change the stop mode into drive mode, thereby preventing an inrush current of DC-DC converters during power input or reactivation.

More particularly, in a preferred aspect of the invention, an inrush current prevention circuit for a DC-DC converter comprises a switching element that transforms an input voltage by being switched on and off and outputs the transformed voltage. A filter filtrates the outputted voltage, transformed via the switching element, and outputs the filtrated voltage as an output voltage. A reference voltage generator generates a reference voltage. An error amplifier compares the reference voltage and output voltage and outputs an error signal. A Pulse Width Modulation (PWM) signal generator generates a PWM signal to switch on and off the switching element according to the error signal. An on-off circuit either transmits or insulates the PWM signal to the switching element. An Electronic Control Unit (ECU) controls the on-off circuit.

The ECU preferably determines a delay period of time according to the input voltage and output voltage by using a pre-estimated map table and actuates the on-off circuit after the delay period of time.

The ECU preferably also determines a reference error value according to the input voltage and output voltage based on a preset map table and activates the on-off circuit when the error value of the error signal inputted from the error amplifier is greater than or equal to the reference error value.

The PWM signal generator suitably includes a triangle wave generator and comparator. The triangle wave generator generates triangle waves. The comparator compares the triangle wave with the error signal and outputs the PWM signal.

The PWM signal generator according to another embodiment of the present invention suitably includes a comparator, PWM reference clock generator, and flip-flop. The comparator compares a current value (outputted from the switching element) and error signal of the error amplifier and outputs the result. The PWM reference clock generator generates a PWM reference clock. The flip-flop outputs a PWM signal by being set by the PWM reference clock and being reset by the output of the comparator.

Other aspects of the invention are described below.

BRIEF DESCRIPTION OF THE DRAWINGS

For a better understanding of the nature and objects of the present invention, reference should be made to the following detailed description with the accompanying drawings, in which.

DETAILED DESCRIPTION OF THE INVENTION

As discussed, the invention includes an inrush current prevention circuit for a DC-DC converter comprises a switching element that transforms an input voltage by being switched on and off and outputs the transformed voltage. The DC-DC converter suitably can provide unidirectional or bi-directional (e.g., using two batteries for the input and output thereof) voltage transformation. A filter filters the outputted voltage, transformed via the switching element, and outputs the filtered voltage as an output voltage. A reference voltage generator generates a reference voltage. An error amplifier compares the reference voltage and output voltage and outputs an error signal. A Pulse Width Modulation (PWM) signal generator generates a PWM signal to switch on and off the switching element according to the error signal. An on-off circuit either transmits or insulates the PWM signal to the switching element. An Electronic Control Unit (ECU) controls the on-off circuit.

Systems of the invention may be particularly useful in a variety of motor vehicles such as passenger automobiles, trucks, buses, commercial vehicles and the like. For instance, systems of the invention may be useful for vehicle fuel pumps as well as electric-powered vehicles.

Figure 1:
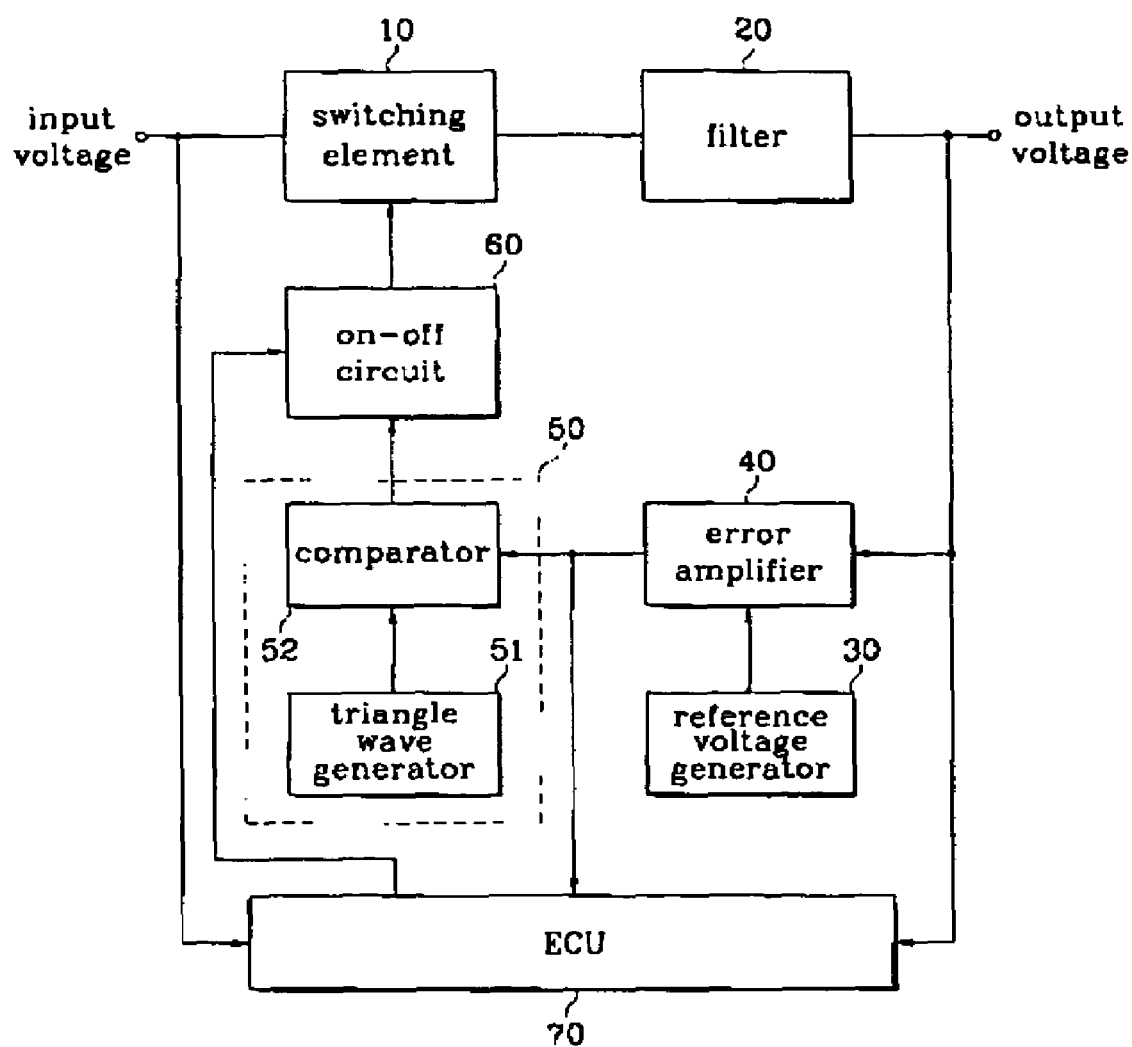
FIG. 1 is a block diagram of an inrush current prevention circuit of a DC-DC converter according to a first embodiment of the present invention.

Referring now to FIG. 1, a switching element 10 is switched on and off by Pulse Width Modulation (PWM) signals inputted from a PWM signal generator 50 through an on-off circuit 60 and transforms (either boosts or steps down the voltage) an input voltage to output into a filter 20. The filter 20 filtrates the voltage transformed in the switching element 10 and then outputs the filtrated voltage as an output voltage.

A reference voltage generator 30 generates a reference voltage, and an error amplifier 40 compares the reference voltage and output voltage, and then outputs an error signal.

The PWM signal generator 50 suitably generates a PWM signal to switch on and off the switching element 10 according to the error signal. The PWM signal generator 50 is a voltage-type PWM signal generator which includes a triangle wave generator 51 and comparator 52. The triangle wave generator 51 suitably generates triangle waves while the comparator 52 compares the triangle wave with error signal and outputs the PWM signal.

The on-off circuit 60 transmits the PWM signal, generated from the PWM signal generator 50, to the switching element 10 according to the control of an Electronic Control Unit (ECU) 70 for activating or deactivating the switching operation of the switching element 10.

The ECU 70 suitably determines a delay period of time according to the input voltage and output voltage by using a pre-estimated map table. The ECU 70 actuates the on-off circuit 60 after the delay period of time to transmit the PWM signal.

When the input voltage is 42V and the output voltage is 14V, the Duty (D) ratio is 14/42=33%. If the input voltage is 36V and the output voltage is 14V, then the Duty (D) ratio is 14/36=39%. The Duty (D) ratio preferably should be raised from zero up to 33% when the input voltage is 42V, and from zero up to 39% when the input voltage is 36V. Therefore, when the input voltage is low in a voltage step-down type DC-DC converter, the delay time extends. If the input voltage is 12V and the output voltage is 42V, the Duty (D) ratio is equal to 1−(12/42)=71.4%. Thus, the Duty ratio of the delay time is raised from zero to 71.4%. However, the input and output voltages are not set at 12V, 36V, and 42V in practice; thus, the delay time is calculated by using a map table based on the above values.

The ECU 70 suitably can control the on-off circuit 60 in other ways in addition to the above described embodiment.

For instance, the ECU 70 determines a reference error value according to the input voltage and output voltage based on a preset map table. Next, the ECU 70 activates the on-off circuit 60 and delivers the PWM signal when the error value of the error signal inputted from the error amplifier 40 is not less than the reference error value. A Duty (D) ratio is determined by the input and output voltages, and the reference error value is determined by the Duty ratio. Therefore, the reference error value according to the input and output voltages can be set predeterminedly as a map table.

Figure 2:
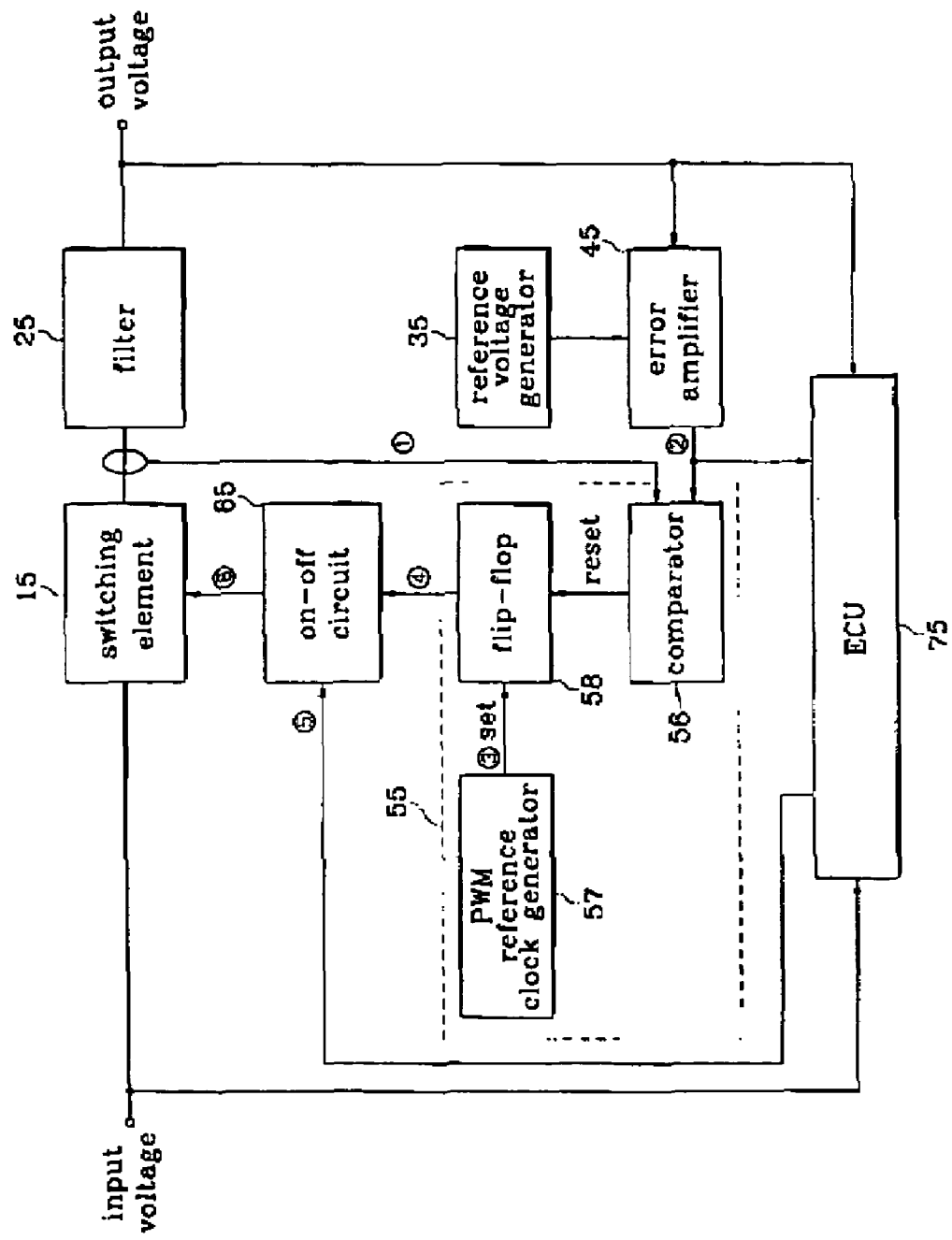
FIG. 2 is a block diagram of an inrush current prevention circuit of a DC-DC converter according to a second embodiment of the present invention.

In reference to FIG. 2, a switching element 15 is switched on and off via the Pulse Width Modulation (PWM) signal inputted from a PWM signal generator 55 through an on-off circuit 65. The switching element 15 then transforms an input voltage to output the transformed voltage into a filter 25. The filter 25 filters the outputted voltage, boosted or stepped down via the switching element 15, and outputs the filtered voltage as an output voltage.

A reference voltage generator 35 generates a reference voltage, and an error amplifier 45 compares the reference voltage and output voltage and outputs an error signal.

The PWM signal generator 55 generates the PWM signal to switch on and off the switching element 15 according to the error signal (of the error amplifier 45) and current value (outputted from switching element 15). The PWM signal generator 55 suitably is a current-type PWM signal generator which includes a comparator 56, PWM reference clock generator 57, and flip-flop 58. The comparator 56 compares the current value (outputted from the switching element 15) and the error signal of the error amplifier 45. The PWM reference clock generator 57 generates a PWM reference clock. The flip-flop 58 outputs a PWM signal by being set by the PWM reference clock and being reset by the output of the comparator 56.

The on-off circuit 65 transmits the PWM signal, generated from the PWM signal generator 55, to the switching element 15 according to the control of an Electronic Control Unit (ECU) 75 to activate or deactivate the switching operation of the switching element 15.

The ECU 75 determines a delay time according to the input voltage and output voltage by using a pre-estimated map table. The ECU 75 delays the operation of the on-off circuit 65 according to the above delay time and then actuates the on-off circuit 65 to transmit the PWM signal.

The ECU 75 suitably can control the on-off circuit 65 in other ways in addition to the above described arrangements. The ECU 75 determines a reference error value according to the input voltage and output voltage based on a preset map table. Next, the ECU 75 activates the on-off circuit 65 and transmits the PWM signal when the error value of the error signal inputted from the error amplifier 45 is greater than or equal to the reference error value.

In the inrush current prevention circuit for a DC-DC converter thus constructed, the on-off circuits 60 and 65 use a transistor (Tr), and the ECU 70 and 75 can be embodied by a microprocessor or comparator.

As described in the first and second embodiments of the present invention, the PWM signal generator of the DC-DC converter can be either the voltage-type PWM signal generator 50 or the current-type PWM signal generator 55.

The DC-DC converter according to preferred embodiments of the present invention suitably can be a unidirectional or bidirectional voltage transformation. However, despite the identical input and output voltages, the duty ratio varies according to the conversion directions, thus the voltage boosting and step-down type should be differently treated to determine the accurate switching operation point. Accordingly, the ECU 70 and 75 should be able to determine the delay time and reference error value according to each type (voltage boosting and voltage step-down type).

Figure 3:
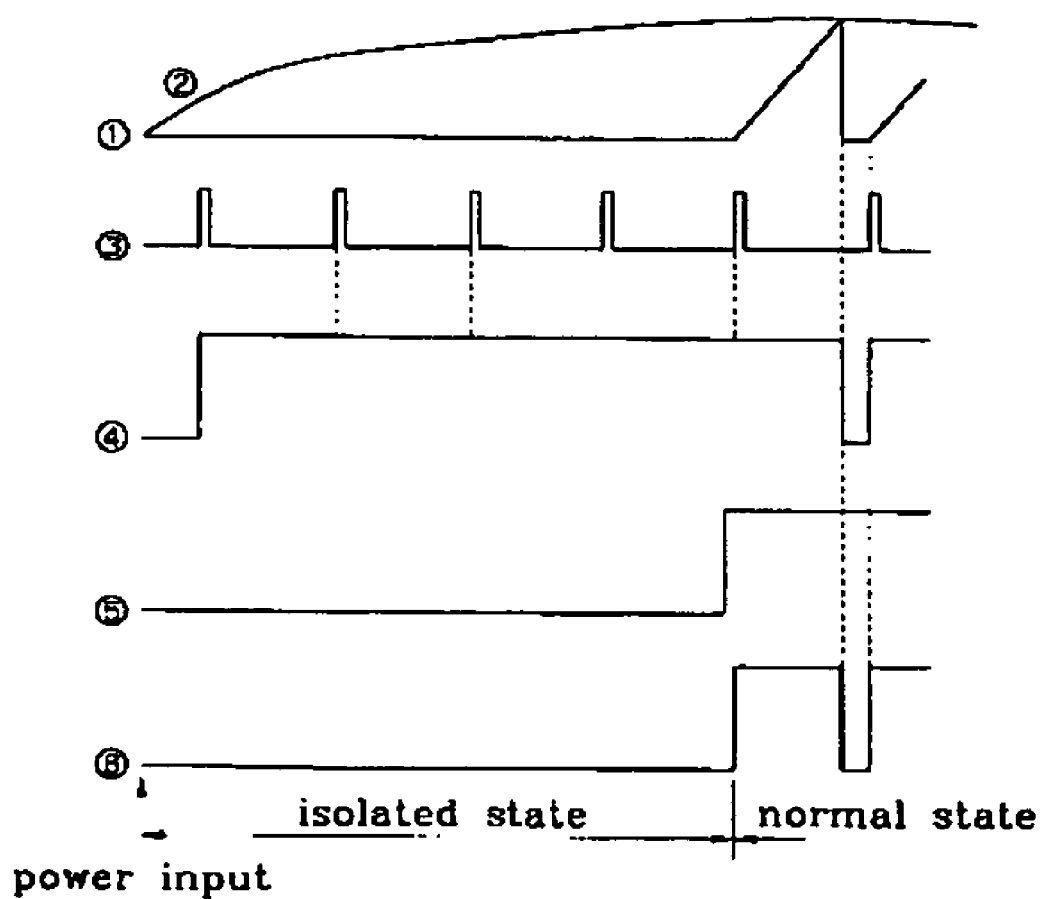
FIG. 3 is a timing view of an inrush current prevention circuit of a DC-DC converter according to the second embodiment of the present invention.

Hereinafter, the operation of the DC-DC converter according to a second embodiment of the present invention will be described with an accompanying drawing, FIG. 3.

As illustrated in FIG. 2, the on-off circuit 65 according to the second embodiment of the present invention is positioned between the PWM signal generator 55 and switching element 15 to control the switching element 15.

The on-off circuit 65 controls the switching operation of the switching element 15 and maintains the switching element 15 in an "off" state during power input or reactivation of the DC-DC converter.

The error amplifier 45 compares the output voltage with the reference voltage outputted from the reference voltage generator 35 and then outputs an error signal □. The error signal □ is inputted into the comparator 56 of the PWM signal generator 55, and the comparator 56 compares the error signal □ with a current value □ outputted from the switching element 15 to output the result as a reset signal of the flip-flop 58. The PWM reference clock generator 57 generates a PWM reference clock □ and outputs □ as a set signal of the flip-flop 58. The flip-flop 58 outputs a PWM signal □ by being set via the PWM reference clock □ and being reset by the output of the comparator 56.

The ECU 75 determines a delay time according to the input voltage and output voltage by using a pre-estimated map table. The ECU 75 delays the operation of the on-off circuit 65 for the above delay time and then outputs a control signal □ to transmit the PWM signal.

The ECU 75 according to another embodiment of the present invention determines a reference error value according to the input voltage and output voltage based on a preset map table. Then, the ECU 75 activates the on-off circuit 65 if the error value of the error signal inputted from the error amplifier 45 exceeds or equals the reference error value and outputs the control signal □ to transmit the PWM signal.

The on-off circuit 65 transmits the PWM signal (outputted from the PWM signal generator 55) to the switching element 15 by being activated when the control signal □ is inputted to thereby switch on and off the switching element 15 according to a PWM signal □ inputted through the on-off circuit 65.

Thus, the inrush current is prevented by delaying the switching operation of the switching element 15 during power input or reactivation.

As indicated by the foregoing, there is an advantage in that an inrush current prevention circuit for a DC-DC converter deactivates a switching element via an on-off circuit during the power input or reactivation and then activates the switching element after a certain delay period of time, thereby preventing damage to the DC-DC converter by preventing an inrush current right after the power input or during reactivation.

While the invention has been described with reference to specific embodiments, modifications and variations of the invention may be constructed without departing from the scope of the invention, which is defined in the following claims.

What is claimed is:

1. An inrush current prevention circuit for a DC-DC converter, comprising:
   a switching element that transforms an input voltage by being switched on and off and outputs the transformed voltage;
   a filter for the outputted voltage, transformed via the switching element, and outputs the filtered voltage as an output voltage;
   a reference voltage generator that generates a reference voltage;
   an error amplifier that compares the reference voltage and output voltage and outputs an error signal;
   a Pulse Width Modulation (PWM) signal generator that generates a PWM signal to switch on and off the switching element according to the error signal;
   an on-off circuit that transmits or isolates the PWM signal to the switching element; and
   an Electronic Control Unit (ECU) that controls the on-off circuit,
   wherein the ECU determines a delay period of time according to the input voltage and output voltage by using a pre-estimated map table and actuates the on-off circuit after the delay period of time, and
   wherein the ECU determines a reference error value according to the input voltage and output voltage based on a preset map table and activates the on-off circuit when the error value of the error signal inputted from the error amplifier is greater than or equal to the reference error value.

2. The circuit as defined in claim 1, wherein the PWM signal generator comprises: a triangle wave generator that generates triangle waves; and a comparator that compares the triangle wave with the error signal and outputs the PWM signal.

3. The circuit as defined in claim 1, wherein the PWM signal generator comprises: a comparator that compares a current value (outputted from said switching element) and error signal of the error amplifier and outputs the result; a PWM reference clock generator that generates a PWM reference clock; and a flip-flop that outputs a PWM signal by being set by the PWM reference clock and being reset by the output of the comparator.

* * * * *